(12) United States Patent
Uematsu et al.

(10) Patent No.: US 6,785,035 B2
(45) Date of Patent: Aug. 31, 2004

(54) OPTICAL ELEMENT, OPTICAL ELEMENT COMPOSITION AND METHOD FOR CONTROLLING STIMULI-RESPONSIVE POLYMER GEL

(75) Inventors: Takashi Uematsu, Minamiashigara (JP); Akinori Komura, Minamiashigara (JP); Hiroaki Tsutsui, Minamiashigara (JP); Jun Kawahara, Minamiashigara (JP); Masato Mikami, Minamiashigara (JP); Ryojiro Akashi, Minamiashigara (JP)

(73) Assignee: Fuji Xerox CO., Ltd, Tokyo (JP)

( * ) Notice: Subject to any disclaimer, the term of this patent is extended or adjusted under 35 U.S.C. 154(b) by 450 days.

(21) Appl. No.: 09/799,525

(22) Filed: Mar. 7, 2001

(65) Prior Publication Data

US 2002/0043655 A1 Apr. 18, 2002

(30) Foreign Application Priority Data

Jul. 25, 2000 (JP) ........................... 2000-224230

(51) Int. Cl.[7] ................................................. G02F 1/15
(52) U.S. Cl. ...................................... 359/265; 250/573
(58) Field of Search ................................. 359/265, 270, 359/271, 272, 273, 253, 254; 250/573; 429/300, 303

(56) References Cited

U.S. PATENT DOCUMENTS 6,287,485 B1 * 9/2001 Akashi et al. ................ 22/583
6,593,588 B1 * 7/2003 Reimer ......................... 250/573
2002/0076616 A1 * 6/2002 Lee et al. ..................... 429/300
2003/0012934 A1 * 1/2003 Kawahara et al. ........... 428/209
2003/0082458 A1 * 5/2003 Oyama ......................... 429/303

FOREIGN PATENT DOCUMENTS

| JP | 61-149926 | 7/1986 |
|---|---|---|
| JP | 4-134325 | 5/1992 |
| JP | 4-274480 | 9/1992 |
| JP | 5-188354 | 7/1993 |
| JP | 7-95172 | 10/1995 |
| JP | 9-160081 | 6/1997 |
| JP | 11-236559 | 8/1999 |

* cited by examiner

*Primary Examiner*—Ricky Mack
*Assistant Examiner*—Brandi N Thomas
(74) *Attorney, Agent, or Firm*—Oliff & Berridge, PLC

(57) ABSTRACT

Described is an optical element having plural electrodes and, disposed therebetween, a stimuli-responsive polymer gel, a liquid which can be absorbed therein and an ion supplying material. As the ion supplying material, preferred is a material showing a volumetric change, in the form of the element, of 0 to 100% under external stimuli. According to the present invention, a novel optical element showing a large change in light transmittance, reflectance or absorption amount and exhibits stable optical properties in repetition can be provided.

19 Claims, 1 Drawing Sheet

OPTICAL ELEMENT, OPTICAL ELEMENT COMPOSITION AND METHOD FOR CONTROLLING STIMULI-RESPONSIVE POLYMER GEL

BACKGROUND OF THE INVENTION

1. Field of the Invention

The present invention relates to a so-called optical element capable of controlling its light scattering amount, reflection amount, absorption amount or transmittance amount in response to electric signals. The optical element of the present invention is useful when adapted to color display devices for displaying images or characters, variable color filters, light modulation elements, light modulation glasses, interior materials or building materials.

2. Description of the Related Art

The technique employed for a light modulation element or display device capable of controlling a light scattering amount, reflection amount, absorption amount or transmittance amount by making use of a polymer gel which reversibly expands or contracts under external stimuli has so far been reported in the below-described patent gazettes.

For example, in Japanese Published Unexamined Patent Application No. Hei 4-134325, proposed is an element which controls a light scattering condition by a density change of a polymer gel expanded or contracted by energization, thereby conducting light modulation or display, depending on opaqueness or transparency. In Japanese Published Unexamined Patent Application No. Hei 5-188354, proposed is an element which makes the particle size of polymer gel particles larger or smaller than the wavelength of light by swelling or contracting the polymer gel particles by energization, thereby conducting light modulation depending on opaqueness or transparency.

In Japanese Published Unexamined Patent Application No. Hei 4-274480, proposed is an optical element which utilizes energization-induced expansion or contraction of a colored polymer gel covalently bonded with a dye. In this application, disclosed is an optical element technique which causes an increase or decrease of an optical absorption cross-sectional area depending on expansion or contraction of the polymer gel due to energization, thereby changing an optical density in Japanese Published Unexamined Patent Application No. Hei 9-160081, proposed is an optical element using a colored substrate and a colored polymer gel in combination. In this application, disclosed is an optical element technique which increases or decreases its optical density by changing a covering ratio of the colored substrate with the colored polymer gel by bending or stretching, or by expanding or contracting the colored polymer gel under electric stimuli.

In Japanese Published Unexamined Patent Application No. Sho 61-149926 and Japanese Published Examined Patent Application No. Hei 795172, proposed is an optical element made up of a composition using in combination a polymer gel which expands or contracts by energization and a colored liquid having a pigment dispersed therein. In Japanese Published Unexamined Patent Application No. Sho 61-149926, disclosed is a technique for utilizing a change in an optical absorption amount of a colored liquid which change occurs at the time when transfer of the colored liquid is caused by a change in the form of the polymer gel by energization. In Japanese Published Examined Patent Application No. Hei 7-95172, disclosed is a technique for preventing electrolysis of a colored liquid, which will otherwise occur by energization, by employing a conductive polymer as an electrode, thereby becoming free from generation of air bubbles due to electrolysis.

In Japanese Published Unexamined Patent Application No. Hei 11-236559, the present inventors proposed an optical element and display device each making use of expanding or contracting properties, under external stimuli, of a polymer gel which contains a pigment at a concentration not less than a saturated absorption concentration. In Japanese Published Unexamined Patent Application No. Hei 11-236559, disclosed is a technique of causing agglomeration or diffusion dispersion of the pigment by expansion or contraction of the polymer gel by energization, thereby causing a change in optical density. In Japanese Published Unexamined Patent Application No. Hei 11-236559, similar to Japanese Published Examined Patent Application No. Hei 7-95172, a technique of employing a conductive polymer as an electrode is disclosed.

The light modulation or display device as disclosed in the above-exemplified official gazettes however has various problems to be overcome.

For example, the elements as disclosed in Japanese Published Unexamined Patent Applications Nos. Hei 4-134325, Hei 5-188354, Hei 4274480, Hei 9-160081 and Sho 61-149926 are accompanied with the problem that whenever a current is supplied, the display quality or light modulation properties are impaired by air bubbles generated upon electrolysis of a liquid emitted from or absorbed in the polymer gel.

Elements, as disclosed in Japanese Published Examined Patent Application No. Hei 7-95172 and Japanese Published Unexamined Patent Application No. Hei 11-236559, which adopt a conductive polymer as an electrode in order to prevent generation of air bubbles due to electrolysis of a liquid are also accompanied with the problem that a sufficient display contrast or a sufficient change in reflectance or light absorption amount cannot be attained owing to a color intrinsic to the conductive polymer adopted as the electrode. In addition, the conductive polymer tends to be deteriorated whenever a current is supplied so that poor durability of the element upon energization still remains as a problem.

SUMMARY OF THE INVENTION

In view of the problems of the related art noted above, the present invention has been made to provide a novel optical element which undergoes a sufficiently large change in a light scattering ratio, reflectance or light absorption amount and in addition, exhibits stability upon repeated use; and also to provide an optical element which has a constitution permitting easy fabrication.

The present invention can be attained by the below-described optical elements, optical element composition and method of controlling a stimuli-responsive polymer gel.

In one aspect of the present invention, there is thus provided an optical element including plural electrodes and disposed therebetween, a stimuli-responsive polymer gel which expands or contracts under external stimuli, a liquid which can be absorbed therein and an ion supplying material having a property of delivering or receiving ions in response to at least an electric field.

An optical element having, as the ion supplying material, a material undergoing, in the form of the optical element, a volumetric change of 0 to 100% in response to external stimuli is preferred. An optical element having an ion conductive material as the ion supplying material is more preferred. As the ion conductive material, that undergoing a change in its internal pH according to the concentration of ions contained therein is preferred, with an ion exchange resin being more preferred.

An optical element having the ion supplying material disposed in the vicinity of at least one of the plural electrodes is preferred, with that having the ion supplying material in the film form being more preferred. An optical element having the ion supplying material of 10 mm to 0.01 μm in film thickness, particularly, the ion supplying material having a smooth surface is preferred. Moreover, an optical element having at least one of the plural electrodes onto which electric insulation treatment has been applied is preferred.

An optical element having the stimuli-responsive polymer gel disposed in the vicinity of the ion supplying material is preferred, with that having the stimuli-responsive polymer gel contained in the ion supplying material being more preferred.

An optical element having a polyelectrolyte gel as the stimuli-responsive polymer get is preferred, of which the stimuli-responsive polymer gel containing a light modulation material is more preferred. Also provided is an optical element wherein the concentration of the light modulation material contained in the stimuli-responsive polymer gel is not less than a saturated absorption concentration or not loss than a saturated scattering concentration upon contraction of the stimuli-responsive polymer gel. Preferred is an optical element having the stimuli-responsive polymer gel which increases its volume upon expansion by at least 5 times compared with that upon contraction.

In another aspect of the present invention, there is also provided an optical element composition, which includes an ion supplying material having a property of delivering or receiving ions in response to at least an electric field, a stimuli-responsive polymer gel and a liquid which can be absorbed therein. An optical element composition having the stimuli-responsive polymer gel incorporated in the ion supplying material is also provided.

In a further aspect of the present invention, there is also provided a method for controlling a stimuli-responsive polymer gel, which includes controlling expansion or contraction of the stimuli-responsive polymer gel based on the delivery or receipt of ions from an ion supply material source having a property of delivering or receiving ions in response to at least an electric field.

In the optical element of the present invention, ions are emitted from or adsorbed to the ion supplying material disposed in the element by the application of an electric field between electrode substrates, leading to a change in the ion concentration of the electrolyte solution. When a material undergoing a change in its internal pH depending on the ion concentration is disposed as an ion supplying material, the pH of the electrolyte solution in the vicinity of the ion supplying material can be changed by increasing or decreasing the ion content in response to an electric field.

In the optical element according to the present invention, since the stimuli-responsive polymer gel filled between the substrates is responsive to this change in the ion concentration or in pH, it can be expanded or contracted in response to an electric field. The polymer gel undergoes a large change in the optical density depending on expansion and contraction so that the optical element of the present invention is capable of causing a large change in the optical density by a volumetric change of the polymer gel in response to an electric field.

Since the optical element of the present invention uses neither electrolysis of water which generates air bubbles and therefore causes a problem in the durability of the element nor a colored conductive polymer which is a cause for impairing optical properties of the element, light modulation or display with a high contrast can be actualized easily.

As described above, the optical element according to the present invention undergoes a large change in an optical scattering ratio, reflectance and absorption amount and has stability upon repeated use. Thus, it is excellent as an optical element.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

Figure 1:
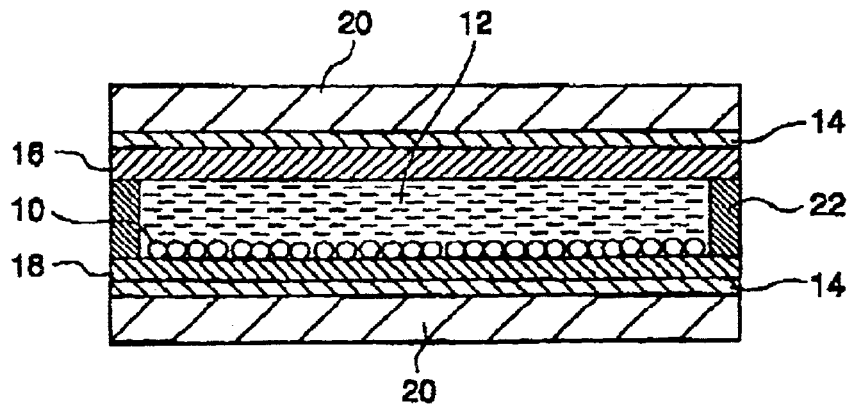
FIG. 1 is a schematic cross-sectional view illustrating one preferred embodiment of the optical element of the present invention.

The optical element according to the present invention has, as a basic constitution, plural electrodes and disposed therebetween, a stimuli-responsive polymer gel which expands or contracts under external stimuli, a liquid which can be absorbed therein and an ion supplying material having a property of delivering or receiving ions in response to at least an electric field. FIG. 1 is a schematic view illustrating one embodiment of the optical element of the present invention.

In the optical element as illustrated in FIG. 1, two electrodes 14 are disposed and between these two electrodes opposite to each other, a spacer 24 for keeping a predetermined space is disposed. Electrodes 14 each has a substrate 20 on its outer surface. Over the inner surfaces of these two electrodes 14, transparent ion supplying materials 16,18 containing ions are disposed, respectively. These ion supplying materials 16,18 are finished to have a smooth surface for preventing light scattering due to the unevenness on the surface of the material.

In the optical element of the present invention, an ion supplying material capable of delivering or receiving ions in response to at least an electric field and undergoing a volumetric change, in the form of the optical element, of 0 to 100% under external stimuli is preferred. The term "volumetric change of 0 to 100%" means that the volumetric change under external stimuli is 0 to 100% in the form of an optical element. It does not mean a volumetric change of the ion supplying material used singly and expanded by a liquid, such as water. In the form of the optical element, the ion supplying material which does not under go a substantial volumetric change is preferred. When a volumetric change, particularly, that exceeding 100% occurs, the ion supplying material becomes a factor for causing destruction or deformation of the optical element upon expansion. Upon contraction, on the other hand, there tends to occur a hindrance in the ion supply such as partial ion supply.

As the ion supplying material, an ion conductive material having a property of migrating ions contained therein is preferred. In one example of the optical element of the present invention, an ion conductive material which undergoes an internal pH change 18 depending on the concentration of ions contained in the material is adopted as the ion supplying material 18.

A stimuli-responsive polymer gel 10 showing a change in the expansion state depending on a change in the ion concentration or pH is disposed on the ion supplying material 18. In this stimuli-responsive polymer gel, a light modulation material is contained. Between two electrodes opposite to each other, filled is a liquid 12 which can be absorbed by the stimuli-responsive polymer gel 10.

The optical element of the present invention is characterized in the an ion supplying material is disposed between electrodes. Since the optical element of the present invention is disposed as the above-described one example, ions are emitted or adsorbed by the ion supplying material in response to an electric field generated when electricity is applied between electrodes, whereby the ion concentration of the liquid 12 filled in the element shows a change. Depending on a change of the ion concentration of the ion supplying material 18 caused by energization, the pH inside of the ion supplying material 18 changes, leading to a pH change on the surface of the material 18. The stimuli-responsive polymer gel 10 disposed over the ion supplying material 18 expands or contracts by such an ion concentration change or a pH change, bringing about a large change in optical properties (light transmittance, reflectance or absorption amount) according to the expanded state.

In the above-described manner, the optical element of the present invention causes expansion or contraction of the stimuli-responsive polymer gel by the energization-induced ion transfer (migration) from the transparent ion supplying material, thereby stably, and largely changing its optical properties in repetition.

The optical element of the present invention is therefore capable of causing expansion or contraction of the stimuli-responsive polymer gel, thereby conducting light modulation, without using electrolysis of the liquid 12 which is not free from the related art problem such as generation of air bubbles or without using a colored conductive polymer which involves a problem in durability upon energization.

A description will next be made of a stimuli-responsive polymer gel which can be employed for the optical element of the present invention; The stimuli-responsive polymer gel usable in the present invention is a polymer gel which expands or contracts under external stimuli. Examples of such a polymer gel include polymer gels which absorb or emit a liquid depending on a pH change, ion concentration change, absorption or desorption of a chemical substance, or oxidation or reduction by electricity, thereby undergoing a volumetric change (expansion or contraction). As the polymer gel, a polyelectrolyte gel sensitively responsive to a pH change or ion concentration change is particularly preferred.

As a polymer gel which undergoes a volumetric change depending on a pH change, a polyelectrolyte gel is preferred. Specific examples include crosslinked gels of poly(meth) acrylic acid or salts thereof, crosslinked copolymer gels between (meth)acrylic acid and (meth)acrylamide, hydroxyethyl (meth)acrylate or alkyl (meth)acrylate or salts of the crosslinked copolymer gels, crosslinked copolymer gels between maleic acid and (meth)acrylamide, hydroxyethyl (meth)acrylate or alkyl (meth)acrylate or salts of the crosslinked copolymer gels, crosslinked gels of polyvinylsulfonic acid and crosslinked copolymer gels between vinylsulfonic acid and (meth)acrylamide, hydroxyethyl (meth) acrylate or alkyl (meth)acrylate or salts of the crosslinked copolymer gels, crosslinked gels of polyvinylbenzenesulfonic acid or salts thereof and crosslinked copolymer gels between vinylbenzenesulfonic acid and (moth)acrylamide, hydroxyethyl (meth)acrylate or alkyl (meth)acrylate or salts of the copolymer gels, crosslinked gels of polyacrylamidealkylsulfonic acid or salts thereof and crosslinked copolymer gels between an acrylamidealkylsulfonic acid and (meth)acrylamide, hydroxyethyl (meth)acrylate or alkyl (meth)acrylate or salts of the copolymer gels, crosslinked gels of polydimethylaminopropyl (meth)acrylamide or salts thereof and crosslinked copolymer gels between dimethylaminopropyl (meth)acrylamide and (meth)acrylic acid, (meth)acrylamide, hydroxyethyl (meth)acrylate or alkyl (meth)acrylate or salts of the copolymer gels, crosslinked composite gels between polydimethylaminopropyl (meth) acrylamide and polyvinyl alcohol or salts thereof, crosslinked composite gels between polyvinyl alcohol and poly(meth)acrylic acid or salts thereof, crosslinked gels of a carboxyalkyl cellulose, and partial hydrolyzates of a crosslinked gel of poly(meth)acrylonitrile or salts thereof. It should be noted that the term "(meth)" as used herein means inclusion of the compound in the parentheses.

As a polymer gel which undergoes a volumetric change 'depending on the adsorption or desorption of a chemical substance such as surfactant, strong ionic polyelectrolyte gels are preferred. Specific examples include crosslinked gels of polyvinylsulfonic acid, crosslinked copolymer gels between vinylsulfonic acid and (meth)acrylamide, hydroxyethyl (meth)acrylate or alkyl (meth)acrylate, crosslinked gels of polyvinylbenzenesulfonic acid, crosslinked copolymer gels between vinylbenzensulfonic acid and (meth) acrylamide, hydroxyethyl (meth)acrylate or alkyl (meth) acrylate, crosslinked gels of a polyacrylamidealkylsulfonic acid, and crosslinked copolymer gels between an acrylamidealkylsulfonic acid and (meth)acrylamide, hydroxyethyl (meth)acrylate or alkyl (meth)acrylate. They may be used in combination with a cationic surfactant, for example, an alkylpyridine salt such as n-dodecylpyridinium chloride, an alkylammonium salt, a phenylammonium salt or a phosphonium salt such as tetraphenylphosphonium chloride. It should be noted that the term "(meth)" as used herein means that the compound in the parentheses is also embraced.

As a polymer gel which undergoes a volumetric change depending on oxidation or reduction by electricity, cationic polyelectrolyte gels can be given as an example. A combination thereof with an electron accepting compound is used preferably as a CT complex (charge transfer complex). Examples of the cationic polyelectrolyte gel include crosslinked gels of a polyamino-substituted (meth) acryalmide such polydimethylaminopropyl acrylamide, crosslinked gels of a poly(amino-substituted alkyl) (meth) acrylate such as polydimethylaminoethyl (meth)acrylate, polydimethylaminoethyl (meth)acrylate or polydimethylaminopropyl (meth)acrylate, crosslinked gels of polystyrene, crosslinked gels of polyvinylpyridine, crosslinked gels of polyvinylcarbazole, and crosslinked gel of polydimethylaminostyrene. Examples of the electron accepting compound include quinones such as benzoquinone, diphenoquinone, 1,4-naphthoquinone and anthraquinone, 7,7,8,8-tetracyanoquinodimethane (TCNQ), methylene blue, tetrabutylammonium perchloride, tetracyanoethylene, chloranil, trinitrobenzene, maleic anhydride and iodine. It should be noted that the term "(meth)" as used herein means inclusion of the compound in the parentheses.

The above-exemplified polymer gels are usable as the stimuli-responsive polymer gel for the optical element of the present invention. Particularly preferred is use of, as the stimuli-responsive polymer gel, a polymer gel having the below-described light modulation material incorporated therein. In an optical element free of a light modulation material, an opaqueness—transparency change is caused by light scattering in accordance with a density change by expansion or contraction of a stimuli-responsive polymer material. In an optical element having a light modulation material incorporated therein, on the other hand, light absorption scattering degree of the light modulation material is changed by expansion or contraction of the stimuli-responsive polymer material.

As a light modulation material to be incorporated in the polymer gel; ordinarily employed dyes or pigments can be used. In addition, materials which absorb or scatter a light other than a visible light, for example, infrared absorbing colorants, infrared absorbing or scattering pigments, ultraviolet absorbing colorants, or ultraviolet absorbing or scattering pigments, can be used preferably as a light modulation material to be contained in the stimuli-responsive polymer gel of the present invention.

Preferred specific examples of the ordinarily employed dyes include black nigrosine dyes and color dyes such as red, green, blue, cyan, magenta and yellow color dyes, for example, azo dyes, anthraquinone dyes, indigo dyes, phthalocyanine dyes, carbonium dyes, quinoneimine dyes, methine dyes, quinoline dyes, nitro dyes, benzoquinone dyes, naphthoquinone dyes, naphthalimide dyes and perinone dyes. Specific examples include C.I. Direct Yellow 1, 8, 11, 12, 24, 26, 27, 28, 33, 39, 44, 50, 58, 85, 86, 87, 88, 89, 98 and 157, C.I. Acid Yellow 1, 3, 7, 11, 17, 19, 23, 25, 29, 38, 44, 79, 127, 144 and 245, C.I. Basic Yellow 1, 2, 11 and 34, C.I. Food Yellow 4, C.I. Reactive Yellow 37, C.I. Solvent Yellow 6, 9, 17, 31, 35, 100, 102, 103 and 105, C.I. Direct Red 1, 2, 4, 9, 11, 13, 17, 20, 23, 24, 28, 31, 33, 37, 39, 44, 46, 62, 63, 75, 79, 80, 81, 83, 84, 89, 95, 99, 113, 197, 201, 218, 220, 224, 225, 226, 227, 228, 229, 230 and 231, C.I. Acid Red 1, 6, 8, 9, 13, 14, 18, 26, 27, 35, 37, 42, 52, 82, 85, 87, 89, 92, 97, 106, 111, 114, 115, 118, 134, 158, 186, 249, 254 and 289, C.I. Basic Red 1, 2, 9, 12, 14, 17, 18 and 37, C.I. Food Red 14, C.I. Reactive Red 23 and 180, C.I. Solvent Red 5, 16, 17, 18, 19, 21, 23, 143, 145, 146, 149, 150, 151, 157 and 158, C.I. Direct Blue 1, 2, 6, 15, 22, 25, 41, 71, 76, 78, 86, 87, 90, 98, 163, 165, 199 and 202, C.I. Acid Blue 1, 7, 9, 22, 23, 25, 29, 40, 41, 43, 45, 78, 80, 82, 92, 93, 127 and 249, C.I. Basic Blue 1, 3, 5, 7, 9, 22, 24, 25, 26, 28 and 29, C.I. Food Blue 2, C.I. Solvent Blue 22, 63, 78, 83 to 86, 191, 194, 195 and 104, C.I. Direct Black 2, 7, 19, 22, 24, 32, 38, 51, 56, 63, 71, 74, 75, 77, 108, 154, 168 and 171, C.I. Acid Black 1, 2, 7, 24, 26, 29, 31, 44, 48, 50, 52 and 94, C.I. Basic Black 2 and 8, C.I. Food Black 1 and 2, C.I. Reactive Black 31, C.I. Food Violet 2, C.I. Solvent Violet 31, 33 and 37, C.I. Solvent Green 24 and 25, and C.I. Solvent Brown 3 and 9. These pigments or dyes may be used singly. Alternatively, they may be used in combination for obtaining a desired color.

Preferred specific examples of the ordinarily employed pigment Include black pigments such as carbon black (channel black, furnace black, etc.), white pigments such as metal oxides, for example, titanium oxide and coloring pigments. Examples of the coloring pigment include benzidine yellow pigments, rhodamine magenta pigments, phthalocyanine cyan pigments and other various pigments such as anthraquinone, azo, azo metal complex, phthalocyanine, quinacridone, perylene, indigo, isoindolinone, quinacridone and allylamide color pigments.

More specific examples of the white pigment include inorganic oxides such as zinc oxide, basic lead carbonate, basic lead sulfate, lead sulfate, lithopone, muscovite, zinc sulfide, titanium oxide, antimony oxide, lead white, zirconium oxide, alumina, micanite, micalex, quartz, calcium carbonate, gypsum, clay, silica, silica acid, diatomaceous earth, talc, basic magnesium carbonate, aluminum white, gloss white and titanium white. Additional examples of the pigment include materials made up of a metal material such as zinc, alumel, antimony, aluminum, aluminum alloy, iridium, indium, osmium, chromium, chromel, cobalt, zirconium, stainless steel, gold, silver, nickel silver, copper, bronze, tin, tungsten, tungsten steel, iron, lead, nickel, nickel alloy, nickelin, platinum, platinum rhodium, tantalum, duralumin, nichrome, titanium, Krupp austenite steel, constantan, brass, platinum iridium, palladium, palladium alloy, molybdenum, molybdenum steel, manganese, manganese alloy, rhodium or rhodium gold; and materials made up of a polymer material such as phenol resin, furan resin, xylene formaldehyde resin, urea resin, melamine resin, aniline resin, alkyd resin, unsaturated polyester, epoxy resin, polyethylene, polypropylene polystyrene, poly-p-xylylene, polyvinyl acetate., acrylic resin, methacrylic resin, polyvinyl chloride, polyvinylidene chloride, fluorine plastic, polyacrylonitrile, polyvinyl ether, polyvinyl ketone, polyether, polycarbonate, thermoplastic polyester, polyamide, diene plastic, polyurethane plastic, polyphenylene, polyphenylene oxide, polysulfone, aromatic heterocyclic polymer, silicone, natural rubber plastic or cellulose plastic.

More specific examples of a yellow pigment, one of the color pigments, include compounds typified by condensed azo compounds, isoindolinone compounds, anthraquinone compounds, azo metal complexes, methine compounds and allylamide compounds. Among them, C.I. Pigment Yellow 12, 13, 14, 15, 17, 62, 74, 83, 93, 94, 95, 109, 110, 111, 129, 129, 147 and 168 are preferred.

Examples of the magenta pigment include condensed azo compounds, diketopyrrolopyrrole compounds, anthraquinone, quinacridone compounds, basic dye lake compounds, naphthol compounds, benzimidazolone compounds, thioindigo compounds and perylene compounds. Among them, particularly preferred are C.I. Pigment Red 2, 3, 5, 6, 7, 23, 48:2, 48:3, 48:4, 57:1, 81:1, 144, 146, 166, 169, 177, 184, 185, 202, 206, 220, 221 and 254.

Examples of the cyan pigment include copper phthalocyanine compounds and derivatives thereof, anthraquinone compounds and basic dye lake compounds. Among them, C.I. Pigment Blue 1, 7, 15, 15:1, 15:2, 15:3, 15:4, 60, 62 and 66 are preferred as a pigment.

The pigment to be employed has preferably a particle size of 0.001 to 1 $\mu$m in terms of an average particle size of primary particles, with 0.01 to 0.5 $\mu$m being particularly preferred. When the particle size is not greater than 0.01 $\mu$m, it tends to flow out from a polymer gel. The particle size not less than 0.5 $\mu$m on the other hand presumably causes a deterioration in color development properties or light scattering properties.

The above-exemplified light modulation material must be contained in the stimuli-responsive polymer gel and not be flowed out therefrom. Preferable examples of preventing this outflow of a light modulation material include optimization of a crosslinking density of the stimuli-responsive polymer gel to physically confine the light modulation material in the net of the polymer; use of a light modulation material having high electric, ionic or physical mutual action with the stimuli-responsive polymer gel; and use of a light modulation material having a chemically modified surface.

For example, when a dye is selected as a light modulation material, a dye having a polymerizable group such as an unsaturated double bond group or a so-called reactive dye which is reactive with the stimuli-responsive polymer gel is preferred. When a pigment is selected as a light modulation material, on the other hand, a pigment having, introduced therein, a group forming, with the polymer gel, a chemical bond, for example, an unsaturated group such as vinyl group or an unpaired electron (radical) is preferred.

The light modulation material to be contained in the stimuli-responsive polymer gel is preferably added in an amount to give a concentration not less than a saturated absorption concentration or not less than a saturated scattering concentration. The term "a concentration not less than a saturated absorption concentration or not less than a saturated scattering concentration" as used herein means that the relationship between the concentration of the light modulation material under a specific optical path and a light absorption amount or light scattering amount falls in a high concentration region far apart from the primary line. In order to add the light modulation material in an amount not less than a saturated absorption concentration or saturated scattering concentration, the concentration of the light modulation material to be contained in the stimuli-responsive polymer gel is preferably set within a range of 3 wt. % to 95 wt. %, preferably 5 wt. % to 80 wt. %, though depending on the light absorption coefficient of the light modulation material. Concentrations of the light modulation material not greater than 3 wt. % do not bring about a saturated absorption concentration, which makes it impossible to attain a sufficient change in the reflectance or light absorption amount even by the volumetric change of the stimuli-responsive polymer gel. Concentrations of the light modulation material not loss than 95 wt. % on the other hand presumably lower the stimuli-responsive properties or a volumetric change amount of the stimuli-responsive polymer gel.

The stimuli-responsive polymer gel containing such a light modulation material can be prepared by crosslinking a uniformly dispersed mixture of an uncrosslinked polymer and a light modulation material, or adding a light modulation material to a polymer precursor monomer composition upon polymerization. In the latter process, chemical bonding of a light modulation material having, as described above, a polymerizable group or an unpaired electron (radical) is also desired. The light modulation material is preferred to be dispersed in the stimuli-responsive polymer gel as uniformly as possible. Upon dispersion in the stimuli-responsive polymer gel, the light modulation material is desired to be dispersed uniformly by utilizing mechanical kneading, stirring or a dispersant.

The stimuli-responsive polymer gel may be in any one of the forms such as spherical, cubic, elliptic, polyhedral, porous, fibrous, star-like, needle-like and hollow particles.

The stimuli-responsive polymer gel preferably has an average particle size of 0.1 $\mu$m to 5 mm, more preferably 1 $\mu$m to 500 $\mu$m under the contracted state. Particle sizes not greater than 0.1 $\mu$m cause problems such as difficulty in its handling gel or impossibility of attaining excellent optical properties. Particle sizes not less than 5 mm, on the other hand, cause problems such as marked elongation of time required for a volumetric change of the polymer gel.

Such stimuli-responsive polymer gel particles can be prepared in a conventional manner such as physical grinding of the stimuli-responsive polymer gel, crosslinking after formation of uncrosslinked stimuli-responsive polymer gel particles by chemical or physical grinding, or particle-forming polymerization such as emulsion polymerization, suspension polymerization or dispersion polymerization In order to promote the volumetric changing properties of the stimuli-responsive polymer gel, it is preferred to make the stimuli-responsive polymer gel porous by the related art technique ordinarily employed for a polymer gel, thereby improving the in and out of a liquid in the gel. As the related art technique, for example, lyophilization of an expanded stimuli-responsive polymer gel is employed to make it porous.

The larger volumetric change amount of the stimuli-responsive polymer gel, the better. A volumetric ratio of the gel upon contraction to that upon expansion is at least 5, preferably at least 10, more preferably at least 15. At a volumetric ratio less than 5, a change amount in reflectance or light absorption amount is insufficient. In the above-described manner, the stimuli-responsive polymer gel for the optical element of the present invention is prepared.

Next, a liquid to be filled in plural electrodes which constitutes the optical element of the present invention will be described. A liquid which can expand the polymer get by being absorbed therein can be used as this liquid. Preferred examples of the liquid include water, aqueous electrolyte solutions, alcohols such as methyl alcohol, ethyl alcohol, propyl alcohol, butyl alcohol and ethylene glycol, ketones such as acetone and methyl ethyl ketone, esters, ethers, dimethylformamide, dimethylacetamide, dimethylsulfoxide, acetonitrile, propylene carbonate and aromatic solvents such as xylene and toluene, and mixtures thereof. To this liquid, a surfactant to be adsorbed or desorbed from the polymer gel, a redox agent for promoting a pH change of the liquid such as viologen derivative, a dispersion stabilizer such as acid, alkali, salt or surfactant, or a stabilizer such as antioxidant or ultraviolet absorber may be added. A mixing ratio of the polymer gel with the liquid preferably ranges from 1:2000 to 1:1 (polymer gel:liquid).

Next, a substrate and electrodes constituting the optical element of the present invention will next be described.

Examples of the substrate usable in the invention include films of a polymer such as polyester, polyimide, polymethyl acrylate, polymethyl methacrylate, polystyrene, polypropylene, polyethylene, nylon, polyvinyl chloride, polyvinylidene chloride, polycarbonate, polyether sulfone and a cellulose derivative, a plate substrate, a glass substrate, a metal substrate and a ceramic substrate. Any materials other than the above-described ones can be used without limitation insofar as it has resistance against the liquid to be filled inside of the optical element and does not easily contain a liquid in the material. An optically transparent material is more preferred as the substrate.

No particular limitation is imposed on the electrode insofar as it has conductivity. Examples include metals such as copper, aluminum, silver and platinum, metal oxides such as tin oxide—indium oxide (ITO), tin dioxide, zinc oxide and zinc oxide—aluminum oxide, conductive polymers such as polypyrroles, polythiophenes, polyanilines, polyphenylene vinylenes, polyacenes and polyacetylenes, and composite materials of a polymer binder with the above-exemplified metal, metal oxide or conductive polymer particles. The electrode is preferably disposed as a layer on the above-described substrate in order to function it as an electrode. An electrode layer having a switching device such as TFT (thin-film transistor) device or MIM (metal/insulator/metal) device disposed on the substrate is also preferred. When the substrate is made of a material having conductivity, it can be used as an electrode.

In the present invention, adopted is a structure which does not always need a colored electrode typified by a conductive polymer so that an optically transparent electrode is particularly preferred.

In the optical element of the present invention, electric insulating treatment is preferably applied onto each of electrodes to prevent electric contact between the electrode and the liquid to be filled between the electrodes. This electric insulation treatment is, for example, conducted by disposal of an insulating layer over the electrode.

Figure 2:
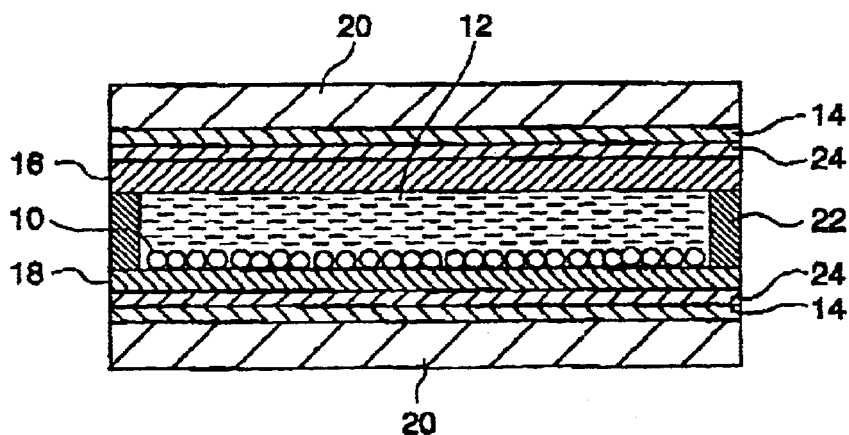
FIG. 2 is a schematic cross-sectional view illustrating another preferred embodiment of the optical element of the present invention.

FIG. 2 is a schematic view illustrating an optical element according to another embodiment of the present invention, wherein an insulating layer has been disposed on an electrode. FIG. 2 is different from FIG. 1 in that insulating layers 24,24 are disposed over electrodes 14,14, respectively. Like elements of structure will be identified by like reference numerals.

No particular limitation is imposed on the material of the insulating layer insofar as it has an electric resistance of $10^6$ $\Omega \cdot cm$ or greater. A polymer resin or inorganic material such as oxidized metal or glass can be used as the insulating layer.

Specific examples of the polymer resin include phenol resin, polyvinyl chloride, cellulose, polystyrene, polycarbonate, polyesters such as polyethylene terephthalate, polybutylene terephthalate or polyarylate, polyacetal, polyamide such as Nylon 6, Nylon 6,6, Nylon, 6,12 or Nylon 11, polyethylene, polypropylene, polyisobutylene, ethylene propylene rubber, polymethacrylate, fluorine resins such as polytetrafluoroethylene, polychlorotrifluoroethylene, polyperfluoroalkoxy, tetrafluoroethylene-hexafluoroethylene copolymer or polyvinylidene fluoride, polyimide resins such as polyamide-imide copolymer or polyimide, polysulfides such as polyphenylene sulfide, polyphenylene oxide, sulfone resins such as polysulfone, polyether sulfone or polyphenylsulfone, dimethylsilicone, epoxy resins such as bisphenol epoxy resin or cyclic aliphatic epoxy resin and phthalic anhydride.

Examples of the inorganic material include oxidized metals such as aluminum oxide, tantalum oxide, niobium oxide, titanium oxide, hafnium oxide, tungsten oxide, bismuth oxide, antimony oxide, lead oxide, barium oxide, zinc oxide, magnesium oxide, calcium oxide, strontium oxide and zirconium oxide, titanate salts such as barium titanate, strontium titanate, lead titanate and zirconate titanate salt, glasses such as borosilicate glass and mica such as muscovite.

An insulating material which is optically transparent, has resistance against a liquid to be filled between the electrodes of the optical element of the present invention and is not easily introduced in a polymer resin is particularly preferred. Moreover, an insulating material having a higher dielectric constant is preferred, with that having a dielectric constant of 2 or greater being particularly preferred.

The insulating layer is preferably thin enough so that an electric field can be applied efficiently to a liquid to be filled between the electrodes of the optical element of the present invention but not so thin as to lose its insulating properties. More specifically, a film of 10 nm to 100 $\mu$m, more preferably 100 nm to 10 $\mu$m thick is desired. The insulating layer is disposed on the substrate by applying thereto a solution having a material of the insulating layer dissolved therein. When an inorganic material is used as a material for the insulating layer, sputtering or sol-gel method can be adopted.

A description will next be made of an ion supplying material which is one of the characteristics of the optical element of the present invention. As the ion supplying material, usable is an ion conductive material which can contain ions and has conductivity due to migration of the ions in response to an electric field. Although materials which can deliver or receive ions in response to at least an electric field can be used, those which undergo, in the form of the optical element, a less volumetric change under external stimuli and have a volumetric changing ratio of 0 to 100% are preferred. Ion supplying materials which are optically transparent are more preferred. The below-exemplified inorganic materials and organic materials can be used as the ion conductive material.

Examples of the inorganic material include oxide ion conductors such as $ZrO_2$-15m/oCaO, $ZrO_2$-8m/o$Y_2O_3$, $ZrO_2$-8m/oSc$_2O_3$, $ThO_2$-7.5m/o$Y_2O_3$, $Bi_2O_3$-12.5m/o$V_2O_5$, $Bi_2O_3$-28.5m/oDy$_2O_3$, $CeO_2$-2.5m/o$Y_2O_3$, $CeO_2$-4m/o$Y_2O_3$, $La_{0.8}Ca_{0.2}AlO_3$ and $CaTi_{0.8}Al_{0.2}O_3$, halide ion conductors such as $LaF_3$, $CaF_2$, $PbCl_2$ and $PbBr_2$, proton conductors such as $H_3Mo_{12}PO_{40} \cdot 29H_2O$, $HuO_2PO_4 \cdot 4H_2O$, $Zr(HPO_4)_2 \cdot 4H_2O$ and $SrCe_{0.95}Yb_{0.05}O_3$, lithium ion conductors such as $Li_3N$, Li-$\beta$-$Al_2O_3$, LiI and LiI-40m/o$Al_2O_3$, sodium ion conductors such as Na-$\beta$-$Al_2O_3$, Na-$\beta$"-$Al_2O_3$ and $Na_3Zr_2Psi_2O_{12}$, silver ion conductors such as AgI, $Ag_3SI$, $RhAg_4I_5$ and $Ag_2S$ and copper ion conductors such as CuBr and $Rb_4Cu_{16}I_7Cl_{13}$. The term "m/o" as used herein means the abbreviation of mole %. The term "(Compound A)X-m/o(Compound B)" means that Compound B is contained in an amount of X mole % relative to Compound A. Such an inorganic material can be preferably employed as the ion supplying material because its volumetric change, in the form of an optical elements under external stimuli is substantially 0 or so.

As the organic material, polymer materials having an ionization group are used. Particularly, ion exchange resins having, as their polymer skeleton, a relatively rigidly-formed network are preferred. Such a material can be used preferably as an ion supplying material, because it does not undergo, in the form of the optical element, a large volumetric change under external stimuli and has a volumetric changing ratio ranging from 0 to 100%. Even a polymer material having an ionization group and undergoes a relatively large volumetric change under external stimuli can be used as an ion supplying material if a change in its optical properties is relatively small, more specifically, a changing ratio of its light transmittance due to a volumetric change is 10% or less.

Specific examples of the ion exchange resin include hydrocarbon ion resins such as styrene cationic exchange resins, phenol cationic exchange resins, phenol anionic exchange resins such as weakly-basic phenol-formaldehyde anionic exchange resins, methacrylic acid cationic resins, styrene anionic exchange resins and condensed amino resins such as weakly basic epoxy anionic exchange resins; and fluorine ion exchange resins such as perfluorosulfonic acid resins.

Among the above-exemplified ion conductive materials, those internally undergoing a pH change depending on the concentration of ions contained in them are preferred. The ion conductive materials are preferred to have therein an acidic or basic ionization group. Specific examples of the acidic ionization group include —$SO_3^-$, —$COO^-$, $PO_3^-$ or —$O^-$, while those of the basic ionization group include quaternary ammonium group, primary, secondary or tertiary amine group and sulfonium group. As the ion conductive materials having such an acidic or basic ionization group, polyelectrolyte gels and ion exchange resins are known. Organic materials exemplified above as the ion conductive material are therefore preferred. In addition, the ion conductive material is preferred to be free from expansion or contraction caused by a change in the concentration of ions contained in it.

Moreover, the ion supplying material such as ion conductive material is preferred to be in the form of a thin film for permitting effective ion migration in response to an electric field or the like. The film thickness is preferably 10 mm to 0.01 $\mu$m, with 1 mm to 1 $\mu$m being particularly preferred. In order to increase the amount of ions to be migrated, it is desired to fill the ion supplying material with a sufficient amount of ions in advance. When an ion conductive material is employed as the ion supplying material, it is immersed in an electrolyte solution having a sufficient electrolyte concentration. The desired electrolyte concentration at this time is 20 mole/liter to 0.1 mole/liter.

Moreover, it is preferred to dispose the ion supplying material in the vicinity of electrodes so as to effectively apply an electric field or the like to the ion supplying material when a current is supplied to the optical element of the present invention, with the ion supplying material closely adhered and fixed to the electrodes being particularly preferred. The ion supplying material can be fixed to the electrodes mechanically, by adhesion or by applying it to the electrodes after melting or dissolving in a solvent. When an insulating layer is disposed on the electrodes, the ion supplying material is preferably disposed in the vicinity on the insulating layer. Fixing is conducted in a similar manner to the case where electrodes have no insulating layer formed thereon.

The ion supplying material is preferred to have a smooth surface for preventing light scattering due to unevenness on the surface of it. More specifically, the ion supplying material is desired to have, on the surface thereof, smoothness permitting a light transmittance of it not less than 50%. The light supplying material having smoothness permitting a light transmittance not less than 60% is more preferred.

The stimuli-responsive polymer gel is desired to be disposed in the vicinity of the above-exemplified ion supplying material or to be incorporated therein. In the former case, the stimuli-responsive polymer gel is particularly preferred to be fixed on the surface of the ion supplying material. Such a disposal or treatment for incorporation is preferred as a way for efficiently stimulating the stimuli-responsive polymer gel with an ion change or pH change of the ion supplying material. Fixation of the stimuli-responsive polymer gel onto the surface of the ion supplying material is desired from the viewpoint of stability in light modulation or display brought by the optical element of the present invention.

The stimuli-responsive polymer gel can be fixed onto the surface of the ion supplying material mechanically, physically by adhesion or the like, or chemically by chemical bonding. Among them, fixation by chemical bonding is preferred. As chemical bonding, ion bonding, hydrogen bonding and covalent bonding may be mentioned by way of example, with covalent bonding being most preferred for stability. Fixation by covalent bonding can be effected, for example, by treating the ion supplying material with a reactive silane coupling agent or the like, thereby introducing a functional group into the ion supplying material and then reacting this functional group with the functional group of the stimuli-reactive polymer gel.

The stimuli-responsive polymer gel can be incorporated in the ion supplying material, for example, by mixing the stimuli-responsive polymer gel with the ion supplying material which has been molten or dissolved in a solvent and dispersing the former in the latter and then drying or heating the dispersion; or by fixing the stimuli-responsive polymer gel onto the substrate, applying thereto the ion supplying material which has been molten or dissolved in a solvent and then drying or heating the substrates.

In the next place, the optical element of the present invention formed of the above-described electrodes, ion supplying material and stimuli-responsive polymer gel will be described.

Figure 3:
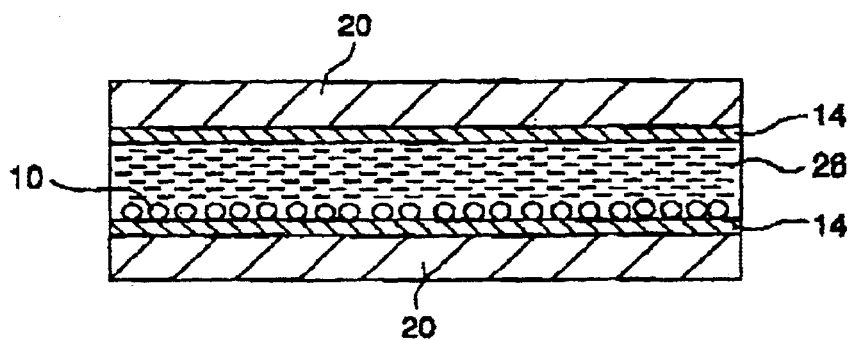
FIG. 3 is a schematic cross-sectional view illustrating a further preferred embodiment of the optical element of the present invention.

The optical element of the present invention has plural electrodes and, disposed therebetween, an ion supplying material, a stimuli-responsive polymer gel and a liquid which can be absorbed therein. More specifically, as illustrated in FIG. 1 or 2, between two electrode substrates which are disposed with a predetermined space kept therebetween by a spacer, the ion supplying material fixed on the surface of the stimuli-responsive polymer gel is disposed on one electrode substrate with a predetermined distance apart from the other the electrode substrates. Into the space thus formed, a liquid which can be absorbed by the stimuli-responsive polymer gel is charged. As illustrated in FIG. 3, on the other hand, a composition having the stimuli-responsive polymer gel embedded in the ion supplying material is inserted in two electrodes opposite to each other in such a way that the composition adheres to each of the electrodes. This composition is impregnated in a liquid which can be absorbed by the stimuli-responsive polymer gel.

The optical element of the present invention as illustrated in FIG. 1 or 2 can be fabricated, for example, by disposing the ion supplying material having the stimuli-responsive polymer gel fixed on the surface thereof between two electrode substrates which are opposite each other with a predetermined space formed therebetween in advance and then filling a liquid which can be absorbed by the stimuli-responsive polymer gel.

The distance between two electrodes is set so that it becomes larger than the thickness of the ion supplying material and the size of the stimuli-responsive polymer gel to permit them to be contained in the optical element of the present invention. It is selected from 2 $\mu$m to 1 cm. In a small-sized optical element of the present invention, the distance preferably ranges from 10 $\mu$m to 1 mm. When the optical element has a thickness less than 2 $\mu$m an optical change due to a volumetric change of the stimuli-responsive polymer gel becomes small, which makes it impossible to attain a desired changing amount. Thickness not less than 1 cm is on the other hand accompanied with such problems as a weight increase of the optical element and impossibility of efficient application of an electric field between electrodes. The electrodes are preferably separated with a proper distance kept therebetween by spraying spacer particles of different sizes, using a film spacer or utilizing a three-dimensional structure formed on the substrate. When two electrode substrates are disposed opposite to each other, they are preferably sealed, at their sides, with an adhesive or a sealant such as ultraviolet curing resin or thermosetting resin. In order to fill the liquid which can be absorbed by the stimuli-responsive polymer gel between two electrode substrates, so-called injection under reduced pressure is preferably employed. Described specifically, for filling of a liquid which can be absorbed by the stimuli-responsive polymer gel between two electrodes substrates, it is preferred to seal the side surfaces of the substrates except a predetermined opening portion with a sealant prior to sealing the whole side surfaces with the sealant and then, inject the liquid from this opening by adjusting the atmospheric pressure inside of the substrates in accordance with the so-called injection under reduced pressure.

The optical element of the present invention as illustrated in FIG. 3 is fabricated, for example, as described below. A film-like composition embedded in the ion supplying material is formed on the electrode substrate and is then impregnated in a liquid which can be absorbed by a stimuli-responsive polymer gel. Then, the outer perpheries of the electrode substrates are sealed with a ultraviolet curing resin while the composition is closely adhered to the electrode substrate, whereby two electrode substrates are adhered. The film thickness of the film-like ion supplying material is selected from a range of from 2 $\mu$m to 1 cm. The small-sized optical element of the present invention has a thickness preferably falling within a range of 10 $\mu$m to 1 mm. When the thickness is not greater than 2 $\mu$m, an optical change due to a volumetric change of the stimuli-responsive polymer gel is small, which makes it impossible to attain a desired changing amount. Thickness not less than 1 cm is on the other hand accompanied with the problems such as an increase in weight of the element and impossibility of efficient application of an electric field between electrodes.

The optical element of the present invention can be used for a light modulation device, light modulation glass, interior or building material for controlling a light reflection amount, light scattering amount, light absorption amount or light transmittance amount and also a display device for displaying images. When stimuli-responsive polymer gels having plural colors are disposed in segments, the resulting optical element can be used for a color display device for variable color filter capable of displaying in full colors, by controlling conditions for energization of segments, thereby changing the color tone of the segments,

EXAMPLES

The present invention will hereinafter be described in detail by Examples. It should however be borne in mind that the present-invention is not limited to or by them.

Example 1

An optical element using an ion exchange resin as an ion supplying material and, as illustrated in FIG. 1, having, disposed on one of two electrodes 14,14 opposite to each other, a film of the ion exchange resin 18 as the ion supplying material was fabricated by the below-described process and its optical properties were evaluated.

A polymer gel was prepared in the following manner as a particulate stimuli-responsive polymer gel 10 containing a light modulation material.

To 5 g of acrylic acid 2 g of dimethylaminopropyl methacrylamide and 3 g of sodium hydroxide as a main monomer and 0.02 g of N,N'-methylenebisacrylamide as a crosslinking agent were added 30 g of distilled water, 0.05 g of ammonium persulfate and 7 g of a carbon black pigment ("Show Black N762", trade name; product of Showa Cabot K.K.) as a light modulation material. The resulting mixture was mixed and stirred with "Emulgen 909" (trade name; product of Kao Corp.) as a surfactant, whereby the corresponding aqueous solution was prepared.

A solution obtained by dissolving 2.0 g of a sorbitol surfactant ("Sorgen 50", trade name; product of Dai-ichi Kogyo Seiyaku Co., Ltd.) in 400 ml of cyclohexane was charged in a reaction vessel purged with nitrogen, followed by the addition to the aqueous solution prepared in advance. They were emulsified by high-speed stirring for 10 minutes by using a rotary agitating blade.

After emulsification, the reaction system was adjusted to 25° C. While stirring further, a 50% aqueous solution of tetramethylethylenediamine was added to the reaction mixture to conduct polymerization. The polymer gel particles thus formed were then collected and then neutralized with an aqueous sodium hydroxide solution. After washing in repetition with distilled water, they were dried. The particles thus obtained had an average particle size of about 25 $\mu$m when dried. In this manner, a polymer gel was prepared.

This polymer gel in the form of particles was found to have a water absorption amount, an absorption amount of distilled water, of about 250 g/g. These particles were expanded or contracted by a pH change from pH 9 to pH 3. The particle size of the expanded particles increased to about 4 times as much as that of the contracted particles, meaning a volumetric change of about 125 times.

A description will next be made of the ion exchange resin to be disposed as an ion supplying material which is one of the characteristics of the optical element of the present invention, electrode and substrate. As the ion exchange resin, the film of a perfluorosulfonic acid resin ("Nafion N117", trade name; product of DuPont) was employed. This ion exchange resin was immersed in a 0.01N aqueous sodium hydroxide solution for about 1 day to fill sodium ions in the ion exchange resin. Then, as the electrode substrate of the optical element of the present invention, two tin oxide glass substrates (5 cm×5 cm×1 mm, "Film U", trade name; product of Asahi Glass Company) were prepared. These glass substrates were electrode substrates having tin oxide disposed on the surface thereof. The ion exchange resin was adhered to the surface of one of the electrode substrates in order to permit efficient electric migration of sodium ions filled inside of this ion exchange resin. As an adhesive, a solution of a perfluorosulfonic acid resin ("Nafion Solution SE-5012", trade name; product of DuPont) similar to that of the ion exchange resin was employed from the viewpoint of affinity. Adhesion was conducted by applying this solution onto the electrode of the electrode substrate, making the ion exchange resin to closely adhere to the thus treated electrode and then heating.

In order to fix the thus-prepared polymer gel onto the other electrode of the electrode substrate which had not been subjected to adhesion treatment of the ion exchange resin, a solution of a silane coupling agent ($\gamma$-aminopropyltriethoxysilane) was applied to the electrode surface of the electrode substrate, followed by heating, whereby a binder layer was formed. A paste solution made up of the stimuli-responsive polymer gel and water was then prepared. This solution was applied onto the layer of this binder, followed by heating to cause chemical reaction between the reactive silane coupling agent and the polymer gel, whereby the stimuli-responsive polymer gel was fixed onto the surface of the electrode.

Using the electrode substrate having the stimuli-responsive polymer gel fixed on its electrode surface and the other electrode substrate having the ion exchange resin adhered thereto, the optical element of the present invention was fabricated.

Spacer particles of 300 $\mu$m for keeping a space of about 300 $\mu$m between the electrode substrates were sprayed on the surface of the electrode substrate having the stimuli-responsive polymer gel fixed thereto. A ultraviolet curing resin for adhering these two electrode substrates was prepared. These two electrode substrates were opposed to each other and the ultraviolet curing resin was applied to the outer periphery of the electrode substrates except one portion. By exposure to ultraviolet rays, the ultraviolet curing resin was cured to seal the outer periphery except the opening portion. Distilled water for expanding the stimuli-responsive polymer gel was injected from the opening portion between the electrode substrates by injection under reduced pressure. This opening was then sealed by application of the ultraviolet curing resin to this opening and exposure to ultraviolet rays. In the above-described manner, the optical element of the present invention was fabricated. The optical element just after the fabrication was expanded with distilled water absorbed in the stimuli-responsive polymer gel. Observation of the surface of the electrode to which the stimuli-responsive polymer gel had been fixed sowed that the whole surface became black with the carbon black pigment.

The function of the optical element of the present invention was evaluated as described below.

The optical element of the present invention was placed on a diffusion reflection plate and then, disposed in an optical densitometer (manufactured by X-Rite Incorporated.) for measuring its reflection optical density. Wiring of the optical element was then conducted so as to apply a voltage, with the electrode substrate having the stimuli-responsive polymer gel fixed thereto as an anode and with the other electrode substrate as a cathode. By the application of a direct voltage to the wire at 1.6V, the surface to which the stimuli-responsive polymer gel of the optical element had been fixed showed a color change from black to almost transparent at once after energization by the contraction of the stimuli-responsive polymer gel. Evaluation of this color change by the optical densitometer revealed a change in the reflection optical density of from about 1.8 to about 0.3. By the application of a voltage having reversed polarity, the surface to which the stimuli-responsive polymer gel had been fixed showed a color change at once from transparent to black by the expansion of the stimuli-responsive polymer gel and the reflection optical density returned to the original value. Such energization was conducted at least 500 times, but generation of air bubbles from the expanded liquid of the stimuli-responsive polymer gel by electrolysis was not observed at all, indicating that a change in reflection optical density was stable. The relationship between the applied voltage and current of the optical element showed that the electric current due to ion migration in the optical element having an ion exchange resin disposed thereon was about 4 times greater than that in the electric element having no ion exchange resin disposed thereon. From this finding, promotion of the ion migration by the ion exchange resin was confirmed. In addition, observation through an optical microscope showed that a volumetric change of the ion exchange resin during energization was about 10% in the form of the optical element.

Thus, it has been found that the optical element having an ion exchange resin disposed thereon as the ion supplying material causes a volumetric change in the stimuli-responsive polymer gel in accordance with the ion migration of the ion exchange resin without causing electrolysis of an expanded liquid, which will otherwise generate air bubbles, thereby attaining a large reflection optical density change and moreover stable response properties in repetition.

Example 2

An optical element of the present invention having a film of an ion exchange resin, which was employed as the ion supplying material, over each of two electrodes opposite to each other was fabricated by the below-described process and its optical properties were evaluated.

A polymer gel was prepared in the following manner as a particulate stimuli-responsive polymer gel containing a light modulation material.

To 5 g of acrylic acid, 5 g of acrylamide and 3 g of sodium hydroxide as a main monomer and 0.02 g of N,N'-methylenebisacrylamide as a crosslinking agent were added 30 g of distilled water, 0.05 g of ammonium persulfate and 10 g of a carbon black pigment ("Show Black N762", trade name; product of Showa Cabot K.K.) as a light modulation material. The resulting mixture was mixed and stirred with "Emulgen 909" (trade name; product of Kao Corp.) as a surfactant, whereby the corresponding aqueous solution was prepared.

A solution obtained by dissolving 2.0 g of a sorbitol surfactant ("Sorgen 50", trade name; product of Dai-ichi Kogyo Seiyaku Co., Ltd.) in 400 ml of cyclohexane was charged in a reaction vessel purged with nitrogen, followed by the addition of the aqueous solution prepared in advance. The mixture was emulsified for 10 minutes by high-speed stirring using a rotary agitating blade.

After emulsification, the temperature of the reaction system was adjusted to 25° C. While stirring further, a 50% aqueous solution of tetramethylethylenediamine was added to the reaction mixture to conduct polymerization. The polymer gel particles thus formed were collected and then neutralized with an aqueous sodium hydroxide solution. After washing in repetition with distilled water, they were dried. The particles thus obtained had an average particle size of about 20 µm when dried. In this manner, a polymer gel was prepared.

These polymer gel particles were found to have a water absorption amount, an absorption amount of distilled waters of about 220 g/g. These particles could be expanded or contracted by a pH change from pH 9 to pH 3. The particle size of the expanded particles increased to about 5 times as much as that of the contracted particles, meaning a volumetric change of about 125 times.

A description will next be made of an ion exchange resin to be disposed as an ion supplying material which is one of the characteristics of the optical element of the present invention, electrode and substrate. As the electrode substrate and ion exchange resin, two tin oxide glass substrates and film of a perfluorosulfonic acid resin similar to those employed in Example 1 were used respectively. Although an ion exchange resin ("Nafion N117", trade name; product of DuPont) was disposed on the electrode of one of two electrode substrates opposite to each other in Example 1, a perfluorosulfonic acid resin solution ("Nafion Solution SE-5012", trade name; product of DuPont) was applied onto the other electrode to form an ion exchange resin film thereon in Example 2. The ion exchange resin N117 disposed on the electrode was immersed in a 0.01N aqueous sodium hydroxide solution as in Example 1 to fill sodium ions in the ion exchange resin.

In order to fix the resulting stimuli-responsive polymer gel onto the film of the ion exchange resin formed from the Nafion solution, a solution of a silane coupling agent (γ-aminopropyltriethoxysilane) was applied to the surface of the ion exchange resin on the electrode substrate, followed by heating, whereby a binder layer was formed. A paste solution made up of the stimuli-responsive polymer gel and water was then applied onto this binder layer and heated to cause chemical reaction between the reactive silane coupling agent and the stimuli-responsive polymer gel, whereby the stimuli-responsive polymer gel was fixed onto the film of the ion exchange resin.

Using the electrode substrate having the ion exchange resin disposed thereon and the other electrode substrate having the stimuli-responsive polymer gel fixed on the surface of the ion exchange resin, the optical element of the present invention was fabricated. Spacer particles of 300 μm similar to those employed in Example 1 were sprayed to the surface of the electrode substrate having the stimuli-responsive polymer gel fixed thereto, whereby a space of about 300 μm was formed between two electrode substrates. The fabrication work thereafter was conducted in a similar manner to Example 1.

The optical element just after the fabrication was expanded with an aqueous sodium hydroxide solution absorbed in the stimuli-responsive polymer gel. Observation of the surface to which the stimuli-responsive polymer gel had been fixed showed that the whole surface became black with the carbon black pigment.

The function of the optical element of the present invention was evaluated as described below.

The optical element of the present invention was placed on a diffusion reflection plate and then, disposed in an optical densitometer (manufactured by X-Rite Incorporated.) for measuring its reflection optical density. Wiring of the optical element was then conducted so as to apply a voltage, with the electrode substrate having the stimuli-responsive polymer gel fixed thereto as an anode and with the other electrode substrate as a cathode. By the application of a direct voltage to the wire at 1.2V, after energization, the surface to which the stimuli-responsive polymer gel of the optical element had been fixed showed a color change from black to almost transparent at once by the contraction of the stimuli-responsive polymer gel. Evaluation of this color change by the optical densitometer revealed a change in the reflection optical density from about 1.8 to about 0.3. By stopping energization or by applying a voltage having reversed polarity, the surface to which the stimuli-responsive polymer gel had been fixed showed a color range at once from transparent to black owing to the expansion of the stimuli-responsive polymer gel and the reflection optical density returned to the first value. Such energization was conducted at least 500 times, but generation of air bubbles from the expanded liquid of the stimuli-responsive polymer gel by electrolysis was not observed at all, indicating a stable change in the reflection optical density. The relationship between the applied voltage and current of the optical element showed that the electric current due to ion migration of the optical element having an ion exchange resin disposed thereon was about 6 times greater than that of the electric element having no ion exchange resin disposed thereon. As a result of measurement, before and after energization by a pH meter, of the pH on the surface of the ion exchange resin to which the stimuli-responsive polymer gel had been fixed, a large pH change from 12 to 3 was confirmed. Observation through an optical microscope showed that this ion exchange resin showed a volumetric change of about 10% during energization in the form of the optical element.

Thus, it has been found that the optical element having an ion exchange resin disposed thereon as the ion supplying material causes a volumetric change in the stimuli-responsive, polymer gel in accordance with the ion migration of the ion exchange resin or a pH change of the film of the ion exchange resin, without causing electrolysis of an expanded liquid, which will otherwise generate air bubbles, thereby attaining a large reflection optical density change and moreover stable response properties in repetition.

Example 3

In a similar manner to Example 2 except that the stimuli-responsive polymer gel was incorporated in the ion exchange resin instead of disposal of the stimuli-responsive polymer gel on the ion exchange resin and that a light modulation material to be contained in the stimuli-responsive polymer gel was changed, an optical element was fabricated.

As a light modulation material to be contained in the stimuli-responsive polymer gel, a phthalocyanine pigment ("Blue No. 1", product of Dainichiseika Color & Chemicals Mfg. Co., Ltd.) was employed. The stimuli-responsive polymer gel prepared as in Example 2 was in the particulate form and had an average particle size of about 20 μm when dried. The stimuli-responsive polymer gel particles had a water absorption amount of about 280 g/g when distilled water was employed. These particles could be expanded or contracted by a pH change from 8 to 3. Compared with the contracted particles, the expanded particles had a particle size of about 5 times greater, that is, a volume of about 125 times greater.

The stimuli-responsive polymer gel was incorporated in the ion exchange resin by using a perfluorosulfonic acid resin solution ("Nafion Solution SE-5012", trade name; product of DuPont). First the stimuli-responsive polymer gel prepared as described above was fixed onto the electrode of an electrode substrate (tin oxide glass substrate) in a similar manner to Example 1 or 2. A Nafion Solution SE5012 was then applied to the surface of the electrode to which the polymer gel had been fixed, followed by heating to embed the stimuli-responsive polymer gel in the ion exchange resin.

The optical element thus fabricated was expanded with an aqueous sodium hydroxide solution absorbed in the stimuli-responsive polymer gel. Observation of the surface having the stimuli-responsive polymer gel fixed thereto showed that the whole surface became blue with the color of the phthalocyanine pigment.

The function of the optical element of the present invention was evaluated in a similar manner to Example 2.

The optical element of the present invention was placed on a diffusion reflection plate and then, disposed in an optical densitometer (manufactured by X-Rite Incorporated.) for measuring its reflection optical density. Wiring of the optical element was then conducted so as to apply a voltage, with the electrode substrate having the stimuli-responsive polymer embedded therein as an anode and with the other electrode substrate as a cathode. By the application of a direct voltage to the wire at 1.2V, after energization, the surface to which the stimuli-responsive polymer gel of the optical element had been fixed showed a color change from blue to almost transparent at once by the contraction of the stimuli-responsive polymer gel. Evaluation of this color change by the optical densitometer revealed a change in the reflection optical density from about 1.5 to about 0.3. By stopping energization or by applying a voltage having reversed polarity, the surface in which the stimuli-responsive polymer gel had been embedded showed a color range at once from transparent to blue by the expansion of the stimuli-responsive polymer gel and the reflection optical density returned to the first value. Such energization was conducted at least 500 times, but generation of air bubbles from the expanded liquid of the stimuli-responsive polymer gel by electrolysis was not observed at all, indicating a stable change in the reflection optical density. The relationship between the applied voltage and current of the optical element showed that the electric current due to ion migration in the optical element having an ion, exchange resin disposed thereon was about 6 times greater than that in the electric element having no ion exchange resin disposed thereon. As a result of measurement, before and after energization by a pH meter, of the pH on the surface of the ion exchange resin in which the stimuli-responsive polymer gel had been embedded, a large pH change from pH 12 to 3 was confirmed. In addition, observation through an optical microscope showed that a volumetric change of the ion exchange resin during energization was about 10% in the form of the optical element.

Thus, it has been found that the optical element having an ion exchange resin disposed thereon as the ion supplying material causes a volumetric change in the stimuli-responsive polymer gel by the ion migration of the ion exchange resin or by a pH change of the ion exchange resin, without causing electrolysis of an expanded liquid, which will otherwise generate air bubbles, attaining a large reflection optical density change and moreover stable response properties in repetition.

Example 4

An optical element of the present invention having a constitution as illustrated in FIG. 3 wherein a composition obtained by embedding a stimuli-responsive polymer gel 10 in an ion supplying material 26 was sandwiched and closely adhered between two electrodes 14,14 opposite to each other was fabricated by the below-described process and its optical properties were evaluated.

As the composition to be held in the optical element, a film-like composition prepared in a similar manner to Example 3 and having a stimuli-responsive polymer gel, which had been fixed onto a tin oxide-glass substrate, embedded in an ion exchange resin was employed. This composition was, similar to Example 3, formed on a tin oxide glass substrate. The film-like composition was filled with sodium ions by immersing the composition in a 0.1N aqueous sodium hydroxide solution for one day. Then, the composition was immersed in distilled water to remove therefrom excess sodium ions, followed by sufficient washing. At the same time, distilled water was incorporated in the composition.

Another similar tin oxide glass substrate having the composition formed thereon was prepared as the electrode substrate and this substrate was disposed to closely adhere to the composition. An ultraviolet curing resin, prepared for adhering these two electrode substrates, was applied to the outer periphery of the electrode substrates. The ultraviolet curing resin as cured by exposure to ultraviolet rays for sealing, whereby the optical element of the present invention was fabricated. Just after fabrication, the optical element was expanded with distilled water absorbed in the stimuli-responsive polymer gel in the ion exchange resin. Observation of the surface in which the stimuli-responsive polymer gel had been embedded showed that the whole surface became blue by the color of the phthalocyanine pigment contained in the gel.

The function of the optical element of the present invention was evaluated in a similar manner to Example 2.

The optical element of the present invention was placed on a diffusion reflection plate and then, disposed in an optical densitometer (manufactured by X-Rite Incorporated.) for measuring its reflection optical density. Wiring of the optical element was then conducted so as to apply a voltage, with the electrode substrate having the stimuli-responsive polymer gel fixed thereto as an anode and with the other electrode substrate as a cathode. By the application of a direct voltage to the wire at 1.2V, the surface to which the stimuli-responsive polymer gel of the optical element had been fixed showed a color change from blue to almost transparent at once by the contraction of the stimuli-responsive polymer gel. Evaluation of this color change by the optical densitometer revealed a change in the reflection optical density from about 1.5 to about 0.4. By applying a voltage having reversed polarity, the surface to which the stimuli-responsive polymer gel had been fixed showed a color change at once from transparent to blue by the expansion of the stimuli-responsive polymer gel and the reflection optical density returned to the first value. Such energization was conducted at least 500 times, but generation, of air bubbles from the expanded liquid of the stimuli-responsive polymer gel by electrolysis was not observed at all, indicating a stable change in the reflection optical density. The relationship between the applied voltage and current of the optical element showed that ion migration in the optical element having an ion exchange resin disposed thereon was promoted compared with that in the electric element having no ion exchange resin disposed thereon. In addition, observation through an optical microscope showed that a volumetric change of the ion exchange resin during energization was about 10% in the form of the optical element.

Thus, it has been found that owing to a composition having the stimuli-responsive polymer gel embedded in the ion supplying material, the optical element causes a volumetric change in the stimuli-responsive polymer gel without causing electrolysis of the expanded liquid, which will otherwise generate air bubbles, attaining a large reflection optical density change and stable response properties in repetition.

Comparative Example 1

In a similar manner to Example 1 except that the ion supplying material was not disposed, an optical element was fabricated. The optical element rightly after fabrication was expanded with distilled water absorbed in the stimuli-responsive polymer gel. Observation of the surface to which the stimuli-responsive polymer gel had been fixed showed that the whole surface became black with a carbon black pigment.

The function of this optical element was evaluated in a similar manner to Example 1.

The optical element was placed on a diffusion reflection plate and then, disposed in an optical densitometer (manufactured by X-Rite Incorporated.) for measuring its reflection optical density. Wiring of the optical element was then conducted so as to apply a voltage, with the electrode substrate having the stimuli-responsive polymer gel fixed thereto as an anode and with the other electrode substrate as a cathode. By the application of a direct voltage to the wire at 1.6V, the surface to which the stimuli-responsive polymer gel of the optical element had been fixed hardly showed a color change. Evaluation of this slight color change by the optical densitometer revealed a change in the reflection optical density from about 1.8 to about 1.7. By applying a voltage having reversed polarity, the color of the surface to which the stimuli-responsive polymer gel had been fixed returned to the color before application and the reflection optical density also returned to the first value. As a result of microscopic observation of the inside of the optical element for observing a volumetric change of the stimuli-responsive polymer gel upon energization, energization at a voltage of 1.6V could not cause a large volumetric change in the stimuli-responsive polymer gel. When the applied voltage was then increased to cause a large volumetric change in the stimuli-responsive polymer gel, a large volumetric change was confirmed but it was accompanied with generation of air bubbles on the electrode due to electrolysis of the expanded liquid.

Thus, it has been found that a voltage enough to cause electrolysis of the expanded liquid is necessary to cause a large change in a reflection optical density when the optical element has no ion supplying material disposed. At such a voltage, however, a stable change in a reflection optical density was not available in repetition owing to generation of air bubbles due to electrolysis.

Comparative Example 2

In a similar manner to Example 2 except that the ion supplying material was not disposed in the optical element and a conductive polymer layer was disposed on the electrode, an optical element was fabricated. It should be noted that the stimuli-responsive polymer gel was fixed onto the surface of the conductive polymer layer.

The conductive polymer layer was disposed on the electrode by conducting electrochemical polymerization of an aqueous pyrrole solution on the electrode of a tin oxide glass substrate. More specifically, with the above-described tin oxide glass substrate as a work electrode and with a platinum plate as a counter electrode, an aqueous solution having 0.1M pyrrole and 0.1M sodium p-toluenesulfonate dissolved therein used as the aqueous pyrrole solution was subjected to electrochemical polymerization while applying to the work electrode a voltage of 0.95V relative to Reference electrode (silver/silver chloride). The stimuli-responsive polymer gel was on the other hand fixed onto the surface of the conductive polymer layer in a similar manner to that employed for fixation in Example 1 or 2. More specifically, a silane coupling agent ($\gamma$-aminopropyltriethoxysilane) solution was applied to the surface of the conductive polymer layer, followed by heating, whereby a binder layer was formed. A paste solution made up of the stimuli-responsive polymer gel and water was then applied to the binder layer, followed by heating to chemically react the silane coupling agent with the stimuli-responsive polymer gel.

Upon completion of the fabrication of the optical element, the stimuli-responsive polymer gel became black, being expanded with an aqueous sodium hydroxide solution absorbed therein. Observation of the surface to which the stimuli-responsive polymer gel had been fixed showed that the surface was blackened with the colors of the conductive polymer and stimuli-responsive polymer gel.

The function of the optical element thus fabricated was evaluated in a similar manner td Example 2.

The optical element was placed on a diffusion reflection plate and then, disposed in an optical densitometer (manufactured by X-Rite Incorporated.) for measuring its reflection optical density. Wiring of the optical element was then conducted so as to apply a voltage, with the electrode substrate having the stimuli-responsive polymer gel fixed thereto as an anode and with the other electrode substrate as a cathode. By the application of a direct voltage to the wire at 1.4V, the surface to which the stimuli-responsive polymer gel of the optical element had been fixed seemed not to show a color change from black after energization though the stimuli-responsive polymer gel contracted at once. Evaluation of this color change by the optical densitometer revealed the reflection optical density remained about 1.85, showing no change. Even by stopping energization or by applying a voltage having reversed polarity, the surface to which the stimuli-responsive polymer gel had been fixed seemed not show a color range though the stimuli-responsive polymer gel was expanded at once. As a result of evaluation by the optical densitometer, the reflection optical density remained about 1.85, showing no change. Such energization was conducted 100 times, but electrolysis-induced generation of air bubbles from the expanded liquid in the stimuli-responsive polymer gel was not observed at all.

Thus, it has been found that the optical element having a conductive polymer disposed instead of an ion supplying material is capable of causing a large volumetric change in the stimuli-responsive polymer gel, but a large optical density change was not available owing to the colored conductive polymer.

The entire disclosure of Japanese Patent Application No. 2000-224230 filed on Jul. 25, 2000 including specification, claims, drawings and abstract is incorporated herein by reference in its entirety.

What is claimed is:

1. An optical element comprising:
    plural electrodes; and, disposed therebetween,
    a stimuli-responsive polymer gel which undergoes expansion or contraction under external stimuli;
    a liquid which can be absorbed therein; and
    an ion supplying material having an ability of delivering or receiving ions in response to at least an electric field, wherein the stimuli-responsive polymer gel is of a particulate form having a range of average particle sizes between 0.1 $\mu$m to 5 mm.

2. An optical element according to claim 1, wherein the ion supplying material has an ability of delivering or receiving ions in response to at least an electric field and undergoes a volumetric change, in the form of the optical element, up to 100% under external stimuli.

3. An optical element according to claim 1, wherein the ion supplying material is an ion conductive material.

4. An optical element according to claim 3, wherein the ion conductive material has a property of undergoing an internal pH change according to the concentration of ions contained therein.

5. An optical element according to claim 1, wherein the ion conductive material is an ion exchange resin.

6. An optical element according to claim 1, wherein the ion supplying material is disposed in the vicinity of at least one of the plural electrodes.

7. An optical element according to claim 1, wherein the ion supplying material is in the film form.

8. An optical element according to claim 7, wherein the ion supplying material has a film thickness of 10 mm to 0.01 $\mu$m.

9. An optical element according to claim 1, wherein the ion supplying material has a smooth surface.

10. An optical element according to claim 1, wherein electric insulation treatment has been applied onto at least one of the plural electrodes.

11. An optical element according to claim 1, wherein the stimuli-responsive polymer gel is disposed in the vicinity of the ion supplying material.

12. An optical element according to claim 1, wherein the stimuli-responsive polymer gel is incorporated in the ion supplying material.

13. An optical element according to claim 1, wherein the stimuli-responsive polymer gel is a polyelectrolyte gel.

14. An optical element according to claim 1, wherein the stimuli-responsive polymer gel contains a light modulation material.

15. An optical element, comprising
plural electrodes; and, disposed therebetween,
a stimuli-responsive polymer gel which undergoes expansion or contraction under external stimuli;
a liquid which can be absorbed therein; and
an ion supplying material having an ability of delivering or receiving ions in response to at least an electric field, wherein the stimuli-responsive polymer gel contains a light modulation material that has a concentration not less than a saturated absorption concentration or not less than a saturated scattering concentration when the stimuli-responsive polymer gel is contracted.

16. An optical element according to claim 1, wherein the volume of the stimuli-responsive polymer gel upon expansion is at least 5 times the volume upon contraction of the stimuli-responsive polymer gel.

17. An optical element composition comprising:
an ion supplying material having an ability of delivering or receiving ions in response to at least an electric field;
a stimuli-responsive polymer gel including a light modulation material; and
a liquid absorbable therein, wherein the light modulation material contained in the stimuli-responsive polymer gel has a concentration not less than a saturated absorption concentration or not less than a saturated scattering concentration when the stimuli-responsive polymer gel is contracted.

18. An optical element composition according to claim 17, wherein the stimuli-responsive polymer gel is contained in the ion supplying material.

19. A method for controlling a stimuli-responsive polymer gel, the method comprising:
controlling expansion or contraction of the stimuli-responsive polymer gel based on the delivery or receipt of ions from an ion supply material source having an ability of delivering or receiving ions in response to at least an electric field, wherein the ion supply material source undergoes a volumetric change of up to 100% under external stimuli.

* * * * *